United States Patent [19]
Seiffert et al.

[11] 3,895,822
[45] July 22, 1975

[54] SAFETY DEVICE

[75] Inventors: Ulrich Seiffert, Jahnskamp; Burckhard Struwe, Fallersleben, both of Germany

[73] Assignee: Volkswagenwerk Aktiengesellschaft, Wolfsburg, Germany

[22] Filed: Sept. 28, 1973

[21] Appl. No.: 401,679

[30] Foreign Application Priority Data
Sept. 28, 1972 Germany............................ 2247595

[52] U.S. Cl........................................... 280/150 SB
[51] Int. Cl.............................................. B60r 21/2
[58] Field of Search........ 280/150 SB; 297/388, 389

[56] References Cited
UNITED STATES PATENTS
3,771,814   11/1973   Hahn............................ 280/150 SB Primary Examiner—Robert R. Song
Attorney, Agent, or Firm—Brumbaugh, Graves, Donohue & Raymond

[57] ABSTRACT

This disclosure concerns a vehicular safety belt arrangement for restraining movement of a seated passenger where the vehicle is suddenly decelerated. Each one of a pair of releasably interconnected safety belt segments is connected at one end to a portion of the vehicular frame. One of the belts is fastened to the vehicle door preferably at a point on the vertical periphery of the door window intermediate the upper and lower edges of the window. The belt remains secured to the door throughout the entire range of door movement. An electrical circuit for a belt disconnect warning system may be connected through the latch joining the two belt segments.

6 Claims, 3 Drawing Figures

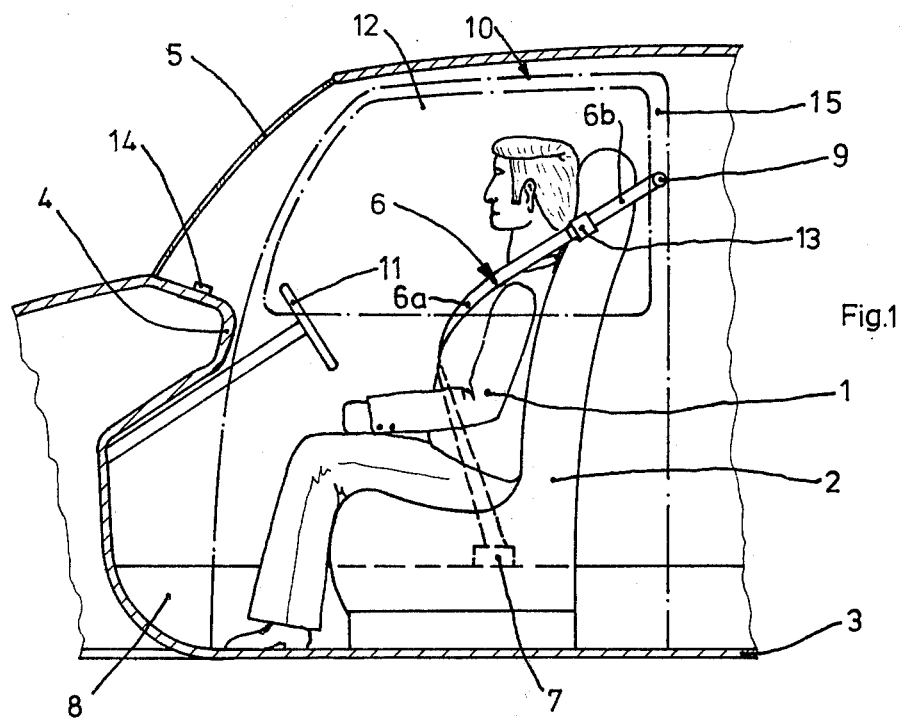
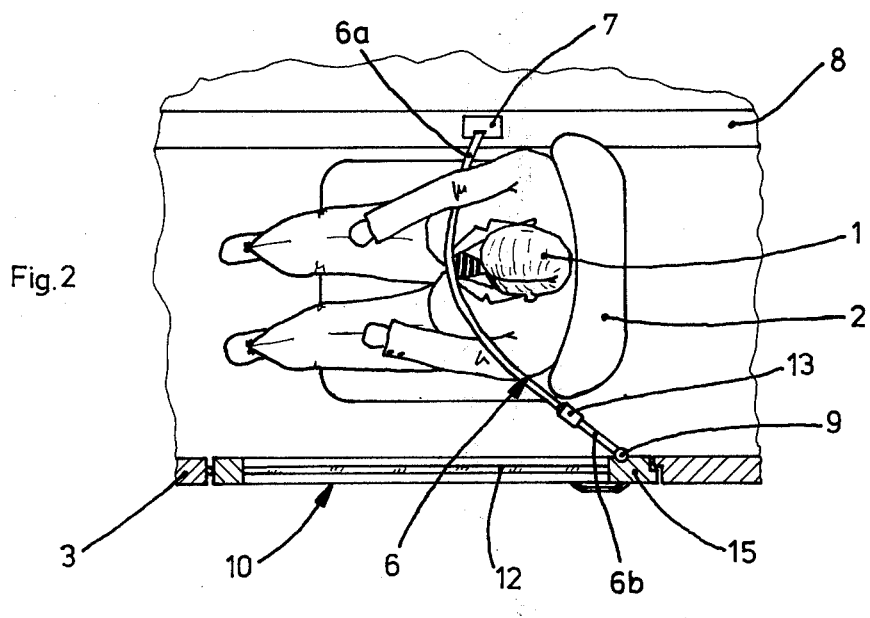

SAFETY DEVICE

BACKGROUND OF THE INVENTION

The invention relates to a safety device for the protection of vehicular passengers, and more particularly to a safety belt arrangement for an automobile. One end of the safety belt arrangement may be retractably wound on a winding spool adjacent the lower edge on one side of a passenger seat, while the other end is fastened to the vehicle door on the other side of the seat.

Safety devices of the general type disclosed herein are generally designated as passive in that they do not require any manipulation of the safety belt by the seat occupant in order to place the belt in proper position. Thus, the safety belt is permanently secured at one end to the door of the vehicle so that the placement of the safety belt across the passenger occurs simultaneously with the closing of the vehicle door. When the door is opened, the safety belt is moved out of the restraining position and is unwound at one end from the winding spool. At the same time the safety belt is moved to a position away from the seat thereby permitting unencumbered access to the seat by a passenger entering the vehicle.

Heretofore, such passive safety belt arrangements have not been provided with belt locks or latches, but rather have consisted of a unitary length of belt extending between the door and the winding spool.

It is customary for the winding spool, on which the safety belt is automatically maintained in retracted position by spring action, to permit limited extraction of the belt to accommodate both opening of the door and minor movements of the seated passenger provided such movements are not too sudden. However, if the force acting to unwind the safety belt from the winding spool is sudden or abrupt, such as when the vehicle is suddenly decelerated by braking or impact, for example, a locking device operates to prevent the unwinding of the belt from the spool. As a result, the occupant is retained in the vehicle seat and is not in danger of being hurled against parts of the internal structure of the vehicle.

However, there is a possibility that due to damages occurring to the vehicle as a result of an accident, the winding spool carrying the safety belt may become blocked so that the belt cannot be unwound. In such a case the door cannot be opened since the belt does not move. Persons occupying the vehicle might therefore be prevented from leaving the vehicle.

SUMMARY OF THE INVENTION

Accordingly, one object of the present invention is to provide a passive safety belt arrangement for an automobile in which the belt consists of a pair of releasably interconnected belt segments which may be manually disconnected from outside the vehicle to permit the door to be opened.

Another object of the present invention is to provide a passive safety belt arrangement for an automobile in which the latching mechanism for connecting the belt segments together is located proximally to the door window so as to be accessible by hand from outside the vehicle.

Still another object of the present invention is to provide a passive safety belt arrangement for an automobile which includes a belt latching mechanism forming part of an electrical circuit for energizing a warning system for vehicle occupants in the event of disconnecting of the safety belt latch mechanism.

In accordance with these and other objects, the present invention obviates the aforementioned disadvantages with respect to the prior type of passive safety belt arrangements by providing for means to release such a safety belt from its encumbering position with respect to the passenger thereby to allow the vehicle door to be opened to permit the occupants to leave the vehicle. According to the invention, such a release of the safety belt may be achieved even where the winding spool has been jammed to block the unwinding of the belt. In addition, the invention provides for access to the safety belt latch from the outside to allow persons who may be in the vehicle and may be helpless after the accident due to loss of consciousness or other disability to leave or be extricated from the vehicle.

In accordance with the invention, the fastening point of the safety belt on the vehicle door is substantially at the level of the door window, and the safety belt in the vicinity of this fastening point is provided with a manually releasable latching mechanism or belt lock. Since the belt lock is located in the vicinity of the door window it is in accordance with a further development of the invention, accessible to manipulation from the outside of the vehicle through the window.

The result is that an occupant, otherwise trapped within the vehicle after an accident which disables the winding spool and prevents extension of the belt, can free himself at all times by manipulating the belt lock to release the joined safety belt segments. In those instances in which an occupant in the vehicle is unable to help himself because of injuries or unconsciousness, release may be easily effected from the outside by helpers, even while the winding spool is blocked. In such a case, it is merely necessary to break the door window so that the belt lock which is situated so as to be visible through the window, can be easily reached and manipulated through the broken window.

A further aspect of the present invention is directed toward minimizing the possibility that a vehicle provided with such a safety device may be used without utilization of the safety belt. Thus the belt lock, may be incorporated as part of an electrical circuit arrangement for intervening in the starter circuit of the vehicle and interrupting such circuit when the belt lock is open.

In the alternative, optical or audible warning devices may be provided jointly or separately and may be connected to a source of energy by means of a switch which is closed when the belt lock is open.

In these embodiments, the engine of the vehicle may not be started with the belt lock open thereby ensuring that the vehicle cannot be driven without the safety belts protectively in place. The optical or audible warning systems of the vehicle may consist of a flashing light or a buzzer which becomes energized in the event that the belt lock should be opened while the engine is running.

BRIEF DESCRIPTION OF THE DRAWING

For a further understanding of the present invention, reference may be had to the accompanying drawing in which:

FIG. 1 is a view partially cut-away, from the side of an automobile showing an occupant strapped to the seat by a safety belt arrangement of the present invention;

FIG. 2 is a plan view from the top of the illustration of FIG. 1.

DESCRIPTION OF THE PREFERRED EMBODIMENTS

Figure 3:
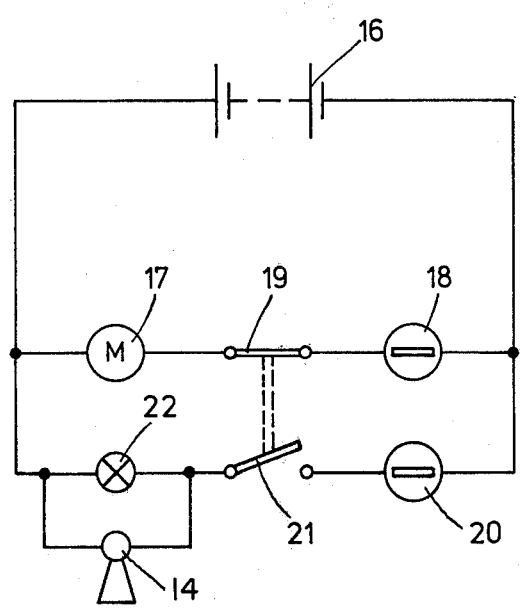
FIG. 3 is a schematic diagram of an electrical circuit for use in connection with vehicular safety belts.

Referring now to the drawing, there is illustrated an automobile seat 2 on which sits a vehicle occupant or passenger who is strapped or retained in the seat 2 by means of a safety belt arrangement, generally indicated by reference numeral 6. The safety belt arrangement 6 consists of a diagonal shoulder belt, which passes from the lower right side of the passenger substantially upwardly and across the chest and left shoulder to a point on a door 10 of the vehicle adjacent a door window 12. This particular design of a safety belt arrangement is generally referred to as the passive type, since manipulation by the passenger is not necessary. As illustrated in the drawing, the safety belt is connected to the door and, accordingly, is moved outwardly and away from the seat when the door is opened. Thus a passenger need only open the door, take the seat and close the door. As the door closes the safety belt is moved into proper position across the seated passenger's chest and shoulder.

The vehicle, illustrated herein by way of example only, consists of a lower frame portion or floor 3 which extends upwardly in the forward cabin area to support an instrument panel 4 located in front of the passenger. A customary windshield 5 is provided atop the substantially horizontal forwardly extending portion of the frame 3 which merges into the hood of the engine compartment of the vehicle.

At the interior central portion of the passenger compartment, the lower vehicle frame 3 takes the form of a tunneled section 8 provided to contain various mechanical linkages and assemblies located on the underside of the vehicle.

In its preferred form the safety belt arrangement 6 consists of a pair of releasably interconnected belt segments 6a and 6b. The belt segment 6a is the longer of the two segments, and has one end which is wound on a spring loaded winding spool 7 fastened to the frame tunnel 8 adjacent the inner side of the seat 2. The other end of the belt segment 6a is provided with one cooperative portion of a belt lock or latching mechanism 13.

The belt segment 6b is fastened at one end to a frame member 15 of the door 10 at a point indicated by way of example, by reference numeral 9. The other end of the safety belt 6a contains the mating portion of the belt lock 13 adapted for interconnection with the corresponding portion on the belt segment 6a.

When the belt segments 6a and 6b are connected together, movement of the door from closed to open position causes the belt segment 6a to be pulled outwardly to unwind from the spool 7. When the door is in its open position the safety belt is therefore substantially fully extended from the spool 7 and has been moved away from the seat to permit access thereto by a passenger. As the door is closed the release of tension on the belt permits the spring within the spool 7 to act to turn the spool thereby causing the belt to wind onto the spool and into a tight position across the passenger.

The fastening point 9 is preferably located longitudinally rearwardly of the passenger and is preferably at least shoulder high. The belt is therefore positioned substantially transversely across the chest of the passenger and over the outside shoulder when the vehicle door is closed.

In the embodiment illustrated, the belt segment 6b is connected to a vertical door frame element which defines the rearward peripheral edge of a window area 12 in the door. The fastening point 9 may be intermediate the upper and lower horizontal boundaries of the window 12 so that the latch mechanism 13 is easily accessible through the window when the door is closed.

The accessibility of the latch mechanism from the window area 12 depends upon the relative lengths of the belt segments 6a and 6b. Preferably the segment 6b is selected so that the latch mechanism 13 lies between the outer side portion of the seat 2 and the door 10. In this position it may be reached by nearly any person capable of inserting an arm through the window toward the interior of the passenger cabin. In addition, this arrangement provides for the sole contact between the passenger and the safety belt to be along the length of the belt segment 6a. The metal of the latch or buckle 13 is therefore positioned away from the passenger lying in a plane which passes through the back of the seat 2 behind the head of the passenger. In this position, the latch or buckle 13 is sufficiently away from the passenger so as not to cause any injury in the event of an accident. In the event that the spool 7 becomes jammed following an accident or other sudden deceleration of the vehicle so that the belt 6 cannot be unwound, either the entrapped passenger, if capable, or another person may simply release the latch 13 to disconnect the belt segments 6a and 6b. The passenger is thereby released from the confines of the safety belt and may be extricated from the vehicle.

In some instances, it has been found desirable to provide the latching mechanism 13 with a disconnecting switch 21 (FIG. 3) of the type which is open when the mechanism 13 is latched and closed when the belt segments 6a and 6b are disconnected. Suitable circuitry and electrical wiring may, in these circumstances, be provided within the belt segments so that the switch 21 is included as part of an electrical circuit. Such a circuit may be used for activating a suitable warning device to indicate to the vehicle operator that the safety belt arrangement 6 is not properly engaged. Such an electrical circuit may be energized either directly by the electrical system 16 of the vehicle or by a separate source of energy, as desired.

One type of suitable warning system consists of an audible or acoustic sound generator 14 located on the instrument panel 4 behind the steering wheel 11 of the vehicle (FIG. 1). The warning system may also include an optical device 22 such as a flashing light on the dashboard or elsewhere within the passenger cabin. The electrical circuit for either of these warning devices may be such as to become operative in the event that the switch in the latching mechanism 13 is closed.

The latching mechanism 13 may also include another switch 19, this switch being interconnected in a suitable way with the electrical circuit of the starter 17 for the vehicle engine. In this circumstance, the interconnection may be such that opening of the switch 19 in the latching mechanism 13, such as by disconnecting the belt segments, in effect opens the electrical circuit for energizing the starter for the engine.

The foregoing warning systems may be employed separately or simultaneously with respect to any particular vehicle. The passenger is therefore reminded that he has to put on the safety belt, either to enable the vehicle engine to be started or to shut off the optical or audible signals if the safety belt is disconnected while the engine is running.

What is claimed is:

1. A vehicular safety device for restraining movement of a seated passenger in the event of a sudden deceleration of a vehicle having door and window substantially adjacent an occupied seat, said device comprising:

first and second releasably interconnected belt elements, one end of said first element being connected to a vehicular frame member adjacent one side of the seat and one end of said second element being connected to the door adjacent the periphery of the window rearwardly of the passenger at the other side of the seat, said releasable interconnection being substantially closer to said one end of said second belt element than to said end of said first belt element and being situated not lower than a horizontal plane including the lower boundary of the window when the vehicle door is closed.

2. The safety device of claim 1 in which said second belt element is connected to a substantially vertical door frame element substantially intermediate the upper and lower boundaries of the window.

3. The safety device of claim 1 in which said releasable interconnection between said first and second belt elements is located substantially in the space between the passenger and the window when the door is closed.

4. The safety device of claim 3 in which said releasable interconnection is located, when the door is closed, substantially within a lateral plane defined by a back support of the seat occupied by the passenger.

5. The safety device of claim 1 in which said releasable interconnection is located substantially within a horizontal plane intermediate the horizontal boundaries of the window when the door is closed.

6. The safety device of claim 1 in which said releasable interconnection comprises a latch mechanism adapted for manual actuation to allow separation of said belt elements.

* * * * *